Patented Aug. 31, 1948

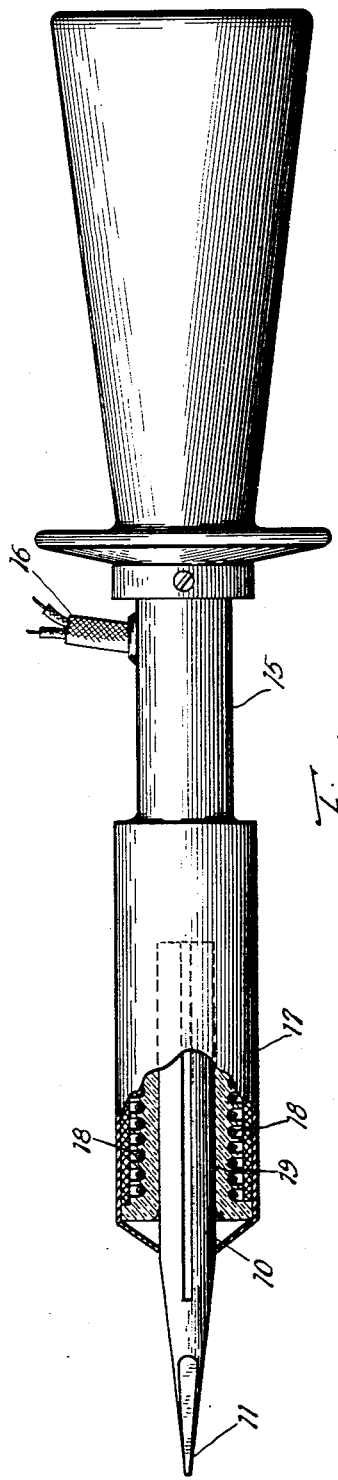
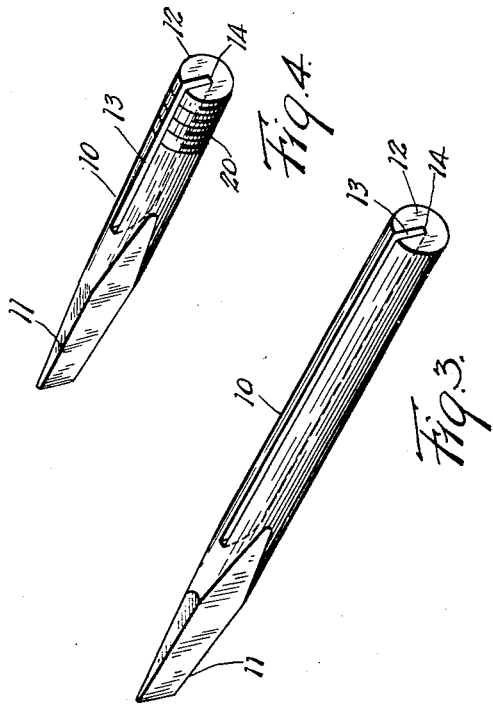

2,448,182

UNITED STATES PATENT OFFICE 2,448,182

ELECTRICALLY HEATED TOOL

Zoltan Kalfen, Chicago, Ill.

Application July 3, 1946, Serial No. 681,185

7 Claims. (Cl. 219—26)

1

This invention relates to electrically heated tools such as soldering irons and more particularly to tips used in such electric soldering irons.

It is the known object of all soldering irons to bring the soldering tips to required temperatures as quickly as possible and the great majority of electric soldering irons now in use are designed and constructed to achieve this purpose. Generally, the heating element is enclosed in a casing which is adapted to snugly receive the tip so that the heat is directly transmitted to the soldering member.

The tips being of high thermal conductivity, their co-efficient of expansion is great and because temperature extremes cause rapid deterioration, frequent tip replacements are necessary.

This combination of circumstances often results in a condition where a worn tip, because of expansion in the sleeve cannot be removed from the iron without reaming or boring which results in impairment or destruction of the heating element necessitating not only replacement of an expensive part, but also delays the use of the soldering iron itself for indefinite periods.

It is an important object of the present invention to obviate the above difficulties by providing a soldering tip which can be used with any conventionl soldering iron and which may easily be removed when desired.

It is a further object of the present invention to provide a soldering tip of high thermal conductivity but wherein the expansion in the sleeve is controlled to permit easy withdrawal.

Another object of the present invention is to provide a soldering tip which will heat faster than the soldering tips now in use without becoming so tightly wedged in the sleeve as to require reaming or boring.

These and numerous other objects and advantages will be apparent throughout the progress of the following specifications.

The accompanying drawing illustrates a selected embodiment of the invention and the views therein are as follows:

Fig. 1 is a plan view partly in section showing the soldering tip in the iron ready for use.

Fig. 2 is an anterior end view of the soldering tip showing the channel therein.

Fig. 3 is a perspective view of a soldering tip embodying the present invention.

Fig. 4 is a perspective view of another form of soldering tip embodying the present invention.

The soldering tip shown herein for the purpose of illustrating the present invention comprises a rod 10 of any desired material, generally

2 of cold rolled copper, having the tapered posterior end 11 and its anterior end sheared at an angle of substantially 90 degrees shown at 12.

Extending along the major portion of the longitudinal section and beyond the anterior end of said rod is the channel 13 preferably $\frac{1}{16}$ of an inch wide and having a depth slightly greater than the transverse centroid of area of said rod as clearly shown at 14 in Figs. 2 and 3. The said channel 13 may be made by any well known method.

Shown in Fig. 1 is the conventional electric soldering iron 15, having the usual electrical connection 16, the head 17 in which is enclosed the heating element 18 and which also provides the sleeve 19 to receive the soldering tip 10. It is not deemed necessary to explain the soldering iron as its construction is well known.

Some forms of conventional soldering irons are constructed to secure the tip to the head by screw threads and in Fig. 4 is shown a soldering tip embodying the present invention having threads 20 at the anterior end for use in such irons.

It has been found to be of utmost importance that the channel 13 be of sufficient length so as to extend through and slightly beyond the head 17 of the soldering iron as clearly shown in Fig. 1 and that the depth of the channel be slightly greater than the transverse controid of area of the tip. A channel width of $\frac{1}{16}$ of an inch has been found to be most satisfactory.

The present invention provides a soldering tip which is extremely simple, inexpensive to manufacture, yet which heats faster than the tips of the prior art. Because of its construction, expansion will not cause wedging in the sleeve of the head and it is easily removable without injuring or destroying the heating element.

Changes may be made in form or construction without departing from the spirit of the invention or sacrificing any of its advantages and the right is hereby reserved to make all changes as fairly fall within the scope of the following claims.

What is claimed as new and desired to be secured by Letters Patent of the United States is as follows:

1. A soldering tip of high thermal conductivity and comprising an elongated fabricated element, a slot extending along a portion of the longitudinal length of said element and beyond the anterior end thereof, said slot being directed inwardly toward the center of said element and extending to a depth slightly beyond said center of said element.

2. A soldering tip of high thermal conductivity comprising an elongated rod fabricated and tapered at the posterior end, a channel extending along a portion of the longitudinal section of said rod and beyond the anterior end thereof said channel being directed inwardly toward the center of said rod and extending to a depth slightly beyond such center.

3. A thermal conducting element comprising an elongated metallic rod, a channel extending along the greater portion of the longitudinal section of said rod beyond its anterior end, said channel being directed inwardly toward the center of said rod and being undercut to a depth slightly beyond said center of said rod, an anterior transverse section machined at an angle of ninety degrees to said longitudinal section and a posterior section tapered and fabricated to facilitate soldering.

4. A thermal conducting element comprising an elongated metallic rod, said rod being tapered and fabricated at the posterior end for solder application, a channel extending along a portion of the longitudinal section of said rod substantially two thirds the length of said rod from the anterior end, said channel extending inwardly toward the center of said rod and to a depth slightly beyond said center.

5. An elongated metallic soldering tip comprising a fabricated longitudinal section, a posterior section fabricated to facilitate soldering, an anterior section sheared at an angle of approximately ninety degrees, a channel substantially $\frac{1}{16}$ of an inch in width, extending along the longitudinal section of said rod beyond the anterior end thereof, said channel being of a length substantially two-thirds of the length of said rod from its anterior end and being directed inwardly toward the center of said rod and to a depth slightly beyond said center.

6. In combination, an electric soldering iron having a heating element within an outer casing adapted to receive a soldering tip, an elongated metallic rod shaped at the posterior end and sheared at an angle of ninety degrees at the anterior end, a channel extending along the longitudinal section of said rod beyond the anterior end thereof, said channel being of a length greater than the length of the portion of the rod enclosed in the said heating element and said channel being directed inwardly toward the center of said rod and being undercut to a depth slightly beyond the center of said rod.

7. In combination, an electric soldering iron having a heating element within an outer casing adapted to receive a soldering tip, a soldering tip of high thermal conductivity capable of fitting in said heating element, said soldering tip being tapered and fabricated at the posterior end, a channel substantially $\frac{1}{16}$ of an inch in width extending along the major portion of the longitudinal section of said soldering tip beyond the anterior end thereof, said channel having a length greater than the length of the portion enclosed in said heating element and being directed inwardly toward the center of said soldering tip to a depth extending slightly beyond said center of said soldering tip centroid of area and a length greater than the length of the portion enclosed in said heating element.

ZOLTAN KALFEN.

REFERENCES CITED

The following references are of record in the file of this patent:

UNITED STATES PATENTS

| Number | Name | Date |
|---|---|---|
| 2,187,806 | Moulthrop | Mar. 16, 1939 |
| 2,359,393 | Sloan | Apr. 29, 1942 |